United States Patent
Grady

(10) Patent No.: US 8,427,080 B2
(45) Date of Patent: Apr. 23, 2013

(54) AUTONOMOUS STREETLIGHT CONTROL

(76) Inventor: John K. Grady, Harvard, MA (US)

(*) Notice: Subject to any disclaimer, the term of this patent is extended or adjusted under 35 U.S.C. 154(b) by 226 days.

(21) Appl. No.: 13/072,882

(22) Filed: Mar. 28, 2011

(65) Prior Publication Data
US 2012/0249017 A1    Oct. 4, 2012

(51) Int. Cl.
*H05B 37/02*    (2006.01)
(52) U.S. Cl.
USPC .......................................... 315/360; 315/308
(58) Field of Classification Search .............. 315/291, 315/307, 308, 360
See application file for complete search history.

(56) References Cited

U.S. PATENT DOCUMENTS

| | | | | |
|---|---|---|---|---|
| 4,410,930 | A * | 10/1983 | Yachabach | 362/145 |
| 6,011,755 | A | 1/2000 | Mulhall et al. | |
| 2011/0062888 | A1* | 3/2011 | Bondy et al. | 315/294 |
| 2012/0306382 | A1* | 12/2012 | Maxik et al. | 315/152 |

* cited by examiner

Primary Examiner — Don Le
(74) Attorney, Agent, or Firm — Donald S. Holland, Esq.; Holland & Bonzagni, P.C.

(57) ABSTRACT

Applicant has disclosed a method for controlling on and off times for streetlights by synchronizing these intervals to recent local daylight conditions without any human intervention. The preferred method comprises: sensing, via a photocell, when dusk and dawn occurs; and then, timing or counting the dusk and dawn times per 24-hour cycle, recording that dusk and dawn data, calculating the average dusk-to-dawn interval for a plurality of preceding 24-hour cycles; predicting, the next dusk time; and turning on the streetlight for a preselected percentage of the calculated average dusk-to-dawn interval. Future "on" time periods are repeatedly calculated as a percentage of the dark periods determined on one or several immediately prior nights, and so varies with the seasons. Unlike the prior art, Applicant's streetlight control does not require field programming or field inputs from the installer or time knowledge. It also does not require any external or internal precision clock or calendar.

13 Claims, 3 Drawing Sheets

AUTONOMOUS STREETLIGHT CONTROL

FIELD OF INVENTION

The present invention relates generally to streetlights. More specifically, it deals with synchronizing when such lights are on or off.

BACKGROUND OF INVENTION

A pre-programmed universal forward-looking calendar can predict sunrise and sunset times in a known way by latitude or time zone. That calendar can include a preset number of programs to control the actual on/off cycle of a streetlight. However, the clock must be phased at installation to local conditions or time, and maintained in correct time, or must be a simple on/off or fixed-time-on-after-sunset design. Those approaches are not ideal across the seasons.

There have been various solutions for controlling street lamps, starting with central controls, often via vacuum tube photocells of the 1920s, and progressing through now widely used individual fixture mounted light sensing controls. Current controls generally use a light sensitive resistor (e.g., a Cadmium sulfide cell) or a photodiode, with solid state processing or timing systems. Such timing systems include various programmable clocks and photocells in combination.

As energy conservation concerns have become more pronounced, the timing systems have become more important. There are several prior art designs which use a combination of a photocell and a pre-programmed duration timer. A timer or clock arrangement can be set or programmed in the field, a long known approach. It also can come preprogrammed with a specific "on" time, in hours, after sensing sundown.

The latter devices will need various versions with differing "light on" times in hours to stock and inventory, sometimes multiplied by specific voltage ratings or switches and taps to set these things at installation. They are also dependent each time (i.e., daily) on photocells or other external inputs to set the initial time of operation. They are presently in worldwide use.

Field programmable individual per light timing units (i.e., clock based) bring up the problem of how to program them easily in a harsh environment (e.g., a utility truck) and the lineman's time and external devices needed to do that programming. This problem, and cost, prevents wide adoption of field programmable devices as of 2011, except for simple "hours on after dark" energy saving designs. For instance, U.S. Pat. No. 6,011,755 to Mulhad describes an electric meter-like enclosure with many keys (e.g., for input), which is not cost effective or practical for individual streetlights. These presently use small simple controls which snap onto the top of the light fixture via a twist-lock socket, ideally with no user inputs.

Further, any streetlight control dependent on photodiode light levels for any function, including phasing of internal clocks to determine sunup and sundown, is subject to problems from shadows, tall buildings, trees, or other spurious lighting such as flood lights. These problems can occur in tunnels, under bridges, parking garages or in narrow city streets. They make operation inherently variable, and sometimes impossible. However, the photodiode approach is useful in open country.

Systems dependent strictly by time still are used widely. Programming needs to be done, whether mechanical or by often complex computer I/O or networked systems, both to set the local time and to set up a calendar program based on local solar events. "Time only" operation, by just a clock, requires a tracking of daily sunset and sunup times. Such tracking requires either an automatic or manual seasonal adjustment, or periodic resetting, or a stored geographically dependent calendar. This means concepts involving precision time (e.g., as disseminated by WWV) still do not address local sunup and sundown in the installed time zone without manual or automatic intervention.

WWV is the call sign of the National Institute of Standards' ("NIST's") shortwave radio station located in Fort Collins, Colo. WWV's main function is the continuous dissemination of official U.S. Government time signals.

Daily tracking of sunset and sundown for any local phasing purpose reverts to the problems of photocells described above, which may or may not be tolerable, depending on view or exposure. However, integrating these events over many days can be a valuable approach and is described herein to predict the next day's sunset, and then storing that information digitally.

Individual control of lamps is widely preferred, due to immunity to total failure of many lamps at one time, and cost issues of signal wires or networks. These calendar and clock functions can be implemented, for example, by computers and programming in microprocessors. However, cost effectiveness of this approach at each lamp is an issue, due to the need to "set it up". Software corruption by transients can happen at any time over a 10-20 year life of the device, giving further pause to this approach due to reliability concerns. Battery backup over a 15-year life also can be a difficult and troublesome prerequisite.

All of the above approaches may be described as suboptimal for universal use as a low-cost and simple, reliable stand-alone and independent outside area lighting or sign control.

Accordingly, is a primary object of the present invention to provide a method and apparatus for synchronizing the on and off time for streetlights by sensing and analyzing local conditions without human intervention.

It is another primary object to provide a control system for turning streetlights off, when such lighting is not needed, to conserve energy.

SUMMARY OF INVENTION

Applicant has created a process for synchronizing the on and off time of street lamps, due to local conditions, without field input from an installer. Applicant's approach is to sense dusk and dawn on prior days, then average the intervals to allow a "percent-on-time" per 24-hour interval (or cycle).

In a preferred embodiment, a NEMA (i.e., National Electrical Manufacturers Association) standard photocell allows for latitude and/or time zone specific solar event prediction on the day of illumination operation. The functionality is phased to local conditions automatically by a sensing photocell where such operation can be obtained a reasonable percentage of the time. A 24-hour clock or simple counter/timer is then used with a percentage "on" time where the on time inherently varies with the seasons. The clock or timer need only be accurate over a 24-hour interval, and self learns the turn on sequence over several days if power is interrupted.

BRIEF DESCRIPTION OF DRAWINGS

The above and other objects will become more readily apparent when the following description is read in conjunction with the accompanying drawings, in which.

DETAILED DESCRIPTION OF PREFERRED EMBODIMENT(S)

Applicant has disclosed alternative methods 100, 300 (see FIGS. 1, 3) for automatically synchronizing the on and off time for streetlights by sensing and analyzing local conditions without human intervention. Applicant's approach is to: sense and record when dusks and dawns occur; average the dusk-to-dawn intervals for a plurality of preceding days; and, upon sensing the next dusk, turning on the streetlight only for a desired percentage of the calculated average intervals.

Applicant has quoted the following excerpts from Wikipedia's (Wikipedia.com) definitions of "SUNSET" and "SUNRISE" to clarify the differences between sundown (a.k.a. sunset) and dusk and sunup (a.k.a. sunrise) and dawn:

. . . The time of sunset is defined in astronomy as the moment the trailing edge of the Sun's disk disappears below the horizon in the west. The ray path of light from the setting Sun is highly distorted near the horizon because of atmospheric refraction, making astronomical sunset occur when the Sun's disk is already about one diameter below the horizon. Sunset is distinct from dusk, which is the moment at which darkness falls, which occurs when the Sun is approximately eighteen degrees below the horizon. The period between the astronomical sunset and dusk is called twilight . . . .

. . . Sunrise is the instant at which the upper edge of the Sun appears above the horizon in the east. Sunrise should not be confused with dawn, which is the (variously defined) point at which the sky begins to lighten, some time before the sun itself appears, ending twilight . . . .

Figure 1:
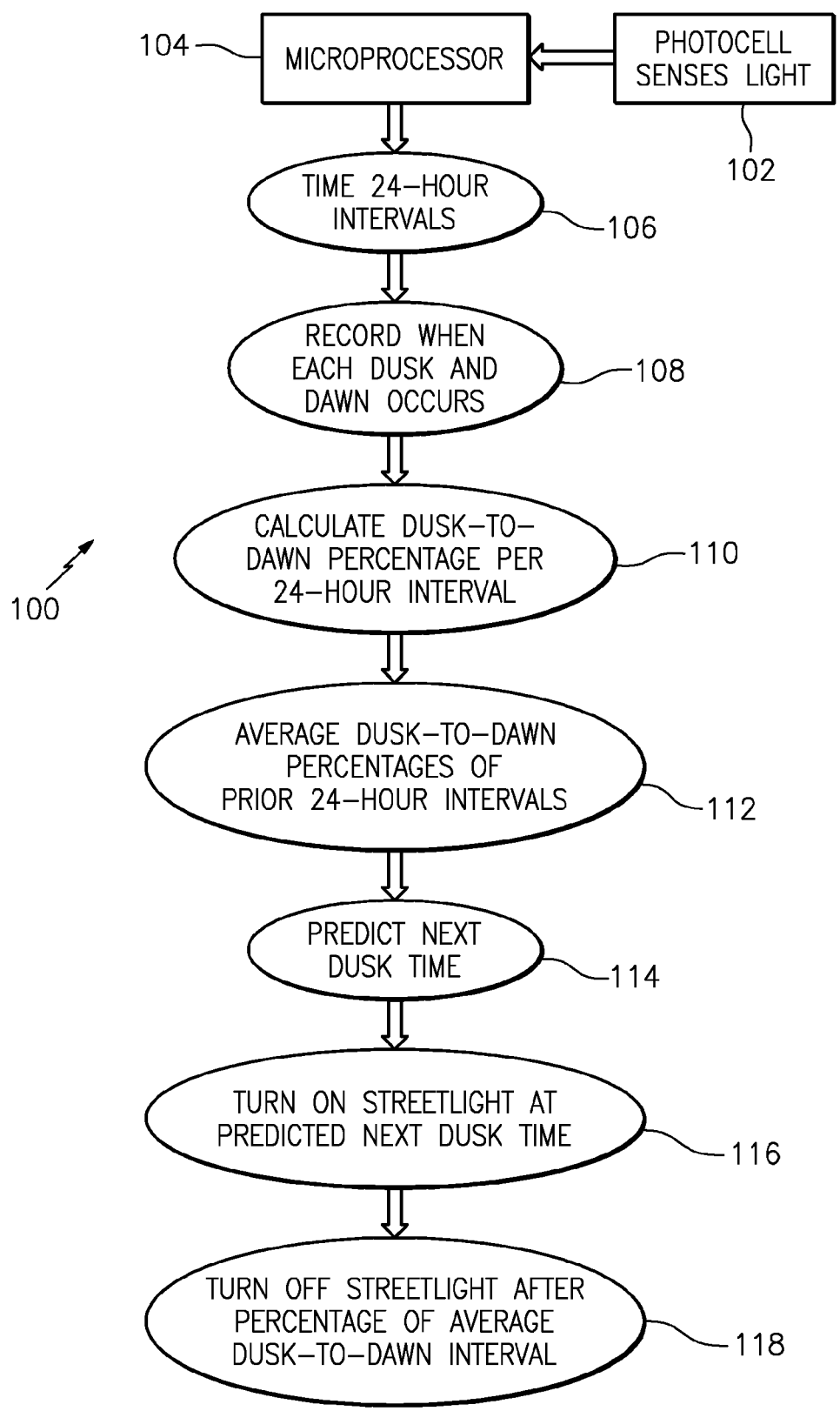
FIG. 1 is a flow chart showing an alternate embodiment of Applicant's "Autonomous Streetlight Control" process which uses a photocell and microprocessor to phase a preset 24-hour cycle to local solar events.

FIG. 1 depicts Applicant's alternate process 100 as a flow chart or block diagram. A photocell (e.g., a photo transistor or photocell device) at step 102 senses light adjacent a streetlight. The photocell then provides this data to any suitable microprocessor (at step 104) with a built-in timer, e.g., preferably, an 8-bit PICO microcontroller by Microchip Technology Inc.

The microprocessor performs several steps. The microprocessor: times or counts successive 24-hour cycles (step 106); determines and stores the dusk and dawn times during each 24-hour cycle (step 108), based upon data from the photocell; calculates and stores the dusk-to dawn interval for each 24-hour cycle (step 110); calculates and stores the average dusk-to dawn interval for a plurality of immediately preceding 24-hour cycles, preferably the last 2-6 cycles (step 112); predicts and stores the next dusk time (step 114); and then turns on a streetlight (step 116), at the next predicted dusk time, only for a desired percentage of the calculated average dusk-to-dawn interval.

Steps 102-116 are repeated preferably each day. That way, the amount of "on" time for the streetlight inherently varies with the seasons.

The desired percentage of the average dusk-to-dawn is selectively determined by, for example, Department of Transportation ("DOT") in a given town or city. As stated above, in the Background section, towns or cities may require the percentage "on" time to be less than 100% for energy conservation and cost savings. Only several lights may be so equipped.

The timer or counter (step 106) need only be accurate over a 24-hour period. It can be a separate device rather than part of a microprocessor.

The photocell (step 102) allows for latitude and/or time zone specific solar event prediction on the day of illumination operation.

The microprocessor preferably self learns the "turn on" sequence for the streetlight over several days, even if power becomes interrupted or the photocell becomes shaded or inoperable, based on short-term projection of prior days and predicting the next dusk time.

Figure 2:
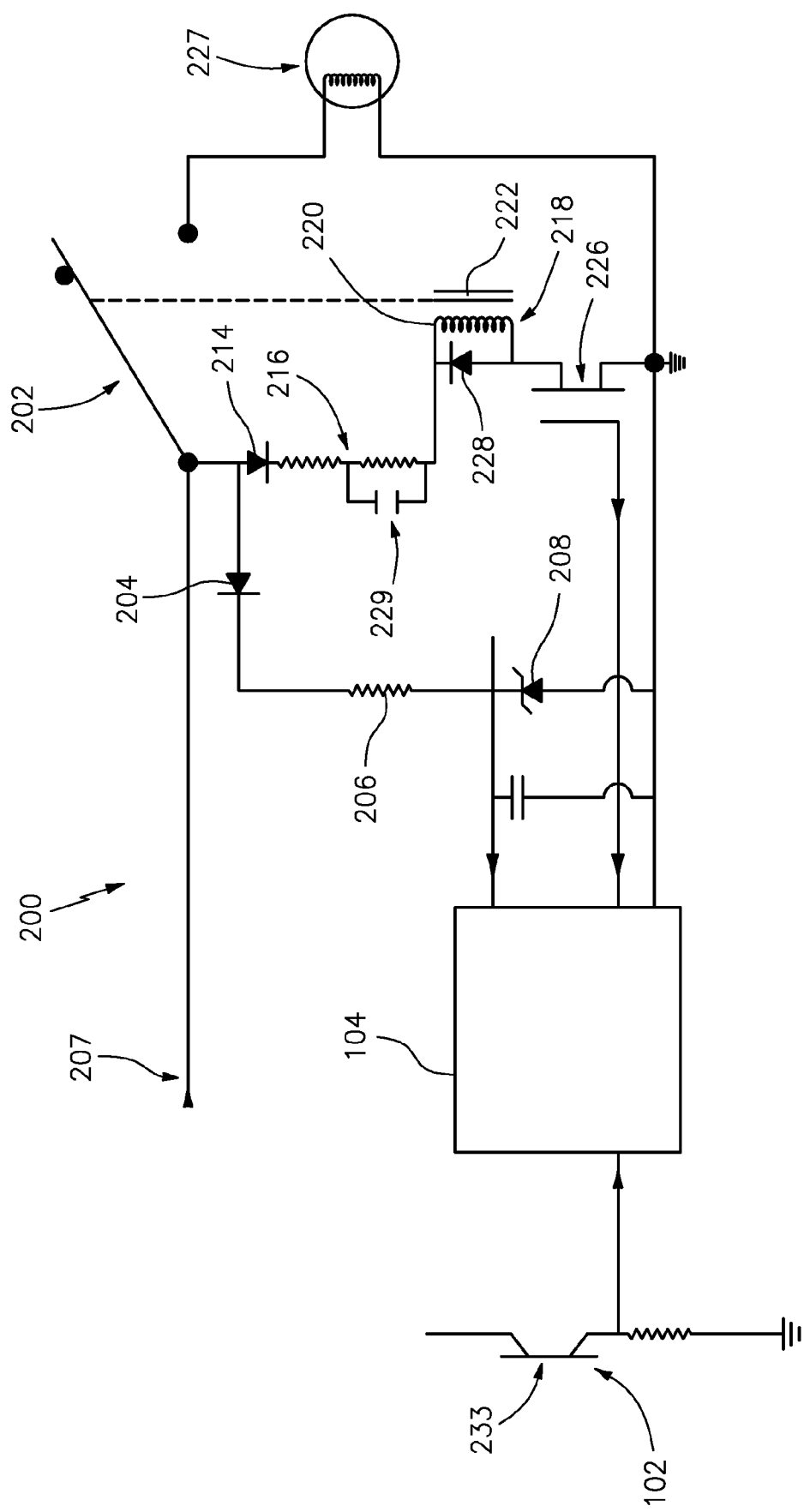
FIG. 2 depicts an electrical circuit containing a cost-effective multi-voltage relay power supply for Applicant's "Autonomous Streetlight Control" components.

FIG. 2 depicts a simple cost-effective multi-voltage relay power supply 200 for a low-voltage street control. This power supply 200 solves a long standing inventory problem of multiple voltages on thermal type photo cell switches.

Referring to FIG. 2, the depicted power supply 200 has two branches and an SPDT (single pole double throw) relay switch 202. Branch one is a simple rectifier diode 204 and resister 206 of about 1 watt rating connected in series. It drops the supply (via line 207)—which can range from 120 V to 480 V—to provide approximately 5V DC to 15V DC at very low current to run the logic, via a Zener diode 208. Full dissipation of the resistor 206 is only reached at 480 V. Consequently, the input-to-the-logic power supply can operate at 120-480 V, enabling a single unit for use at multiple voltages.

Branch two (see FIG. 2) involves a similar circuit, but a low coil power relay is operated typically by half-wave DC by, in series: another rectifier diode 214; a series resistor 216; a relay 218 having a relay coil 220 wrapped around an iron core 222; a HV field effect transistor in series (FET) comprising a semiconductor gate 226 and a streetlight 227. The relay 218 is held in between half-wave pulses by a "shading coil" or a shunt diode 228, also in a known way. A capacitor 229 across part of the series "R" (optional) provides "pull in" at a higher momentary current; the relay 218 will "hold in" at much lower values than the pull in (i.e., design voltage) which is the basis of this design, the point being to avoid dissipation in the dropping resistor. Unlike transistors, optocouplers, or silicon-controlled rectifiers (SCRs), the FET switch consumes no power from the streetlight control circuit, a critical improvement.

A specific dissipation thermal relay cannot be used this way, because thermal relays in general cannot be used across multiple voltages. The $E^2/R$ relationship causes a wide variation in heat effect when input voltage varies. This leads to an inventory of controls for multiple application voltages, as is common now with photocell controls using the common thermal relay technology.

FIG. 2 also shows the streetlight control components of FIG. 1 attached to the relay power supply 200: the microprocessor 104; and the photocell (e.g., a photo transistor or photocell device) 102, which senses light at 233. Applicant had mentioned the microprocessor (at 104) and photocell (at 102) while describing the process steps of FIG. 1.

Though not preferred, Applicant's microprocessor 104 can also support a simple ON/OFF or certain "number-of-hours-on" approach—all are available in the same physical unit.

Figure 3:
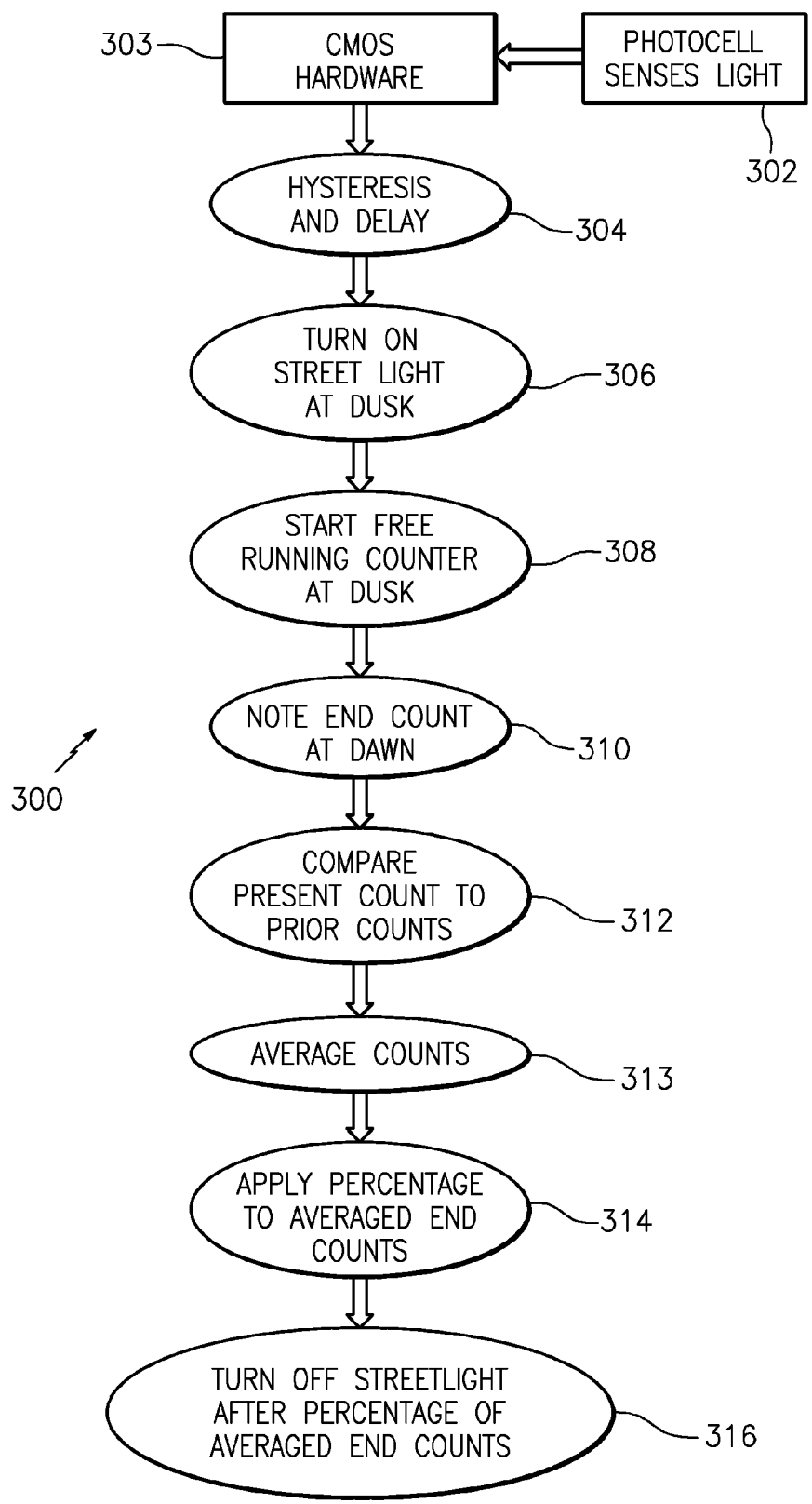
FIG. 3 is a simplified flow chart showing Applicant's preferred "Autonomous Streetlight Control" process which uses a photocell and dedicated hardware (i.e., CMOS chips), instead of a microprocessor, to phase a preset 24-hour cycle to local solar events.

FIG. 3 depicts Applicant's preferred "Autonomous Streetlight Control" process 300 which uses a photocell and dedicated hardware (instead of microprocessor 104) to phase a preset 24-hour cycle to local solar events. The functionality, run preferably by a set or array of suitable complementary metal-oxide-semiconductor ("CMOS") chips, is used to perform similar functions to the microprocessor (step 104 in FIG. 1).

As shown in FIG. 3, a photocell (e.g., a phototransistor or photocell device) at step 302 senses light adjacent a streetlight. The photocell then emits a signal to the CMOS array at step 303. The CMOS array then performs several functions: at step 304, exhibits hysteresis and later, upon dusk (or dark time); turns on (step 306) the streetlight at dusk (or dark time); starts a free counter (step 308) at dusk (or dark time); notes and stores the counter's end count at dawn (step 310); compares that end count to the previous end counts (step 312) for a plurality (preferably 2-6) of immediately preceding 24-hour intervals or cycles; average (step 313) those present and previous counts; multiply (step 314) the average end-count times a preselected and preset percentage (100 percent or less) to set an interval of "on" time for the streetlight during the next dusk (or dark time); and, turns off the streetlight (step 316) after a previously set interval of "on" time, based an average of the plurality of the immediately preceding end counts multiplied by the preselected and preset percentage.

Steps 302-316 are repeated preferably each day. That way, the amount of "on" time for the streetlight inherently varies with the seasons.

Applicant's preferred method 300 can also include: predicting the next dusk time by noting the counts of dusk times ("dusk counts") and averaging the dusk counts for preferably 2-6 immediately preceding 24-hour intervals or cycles; and later turning on the streetlight at the predicted next dusk time.

Applicant's preferred circuitry is a modification of FIG. 2. Instead of the illustrated microprocessor 104, an array or set of CMOS chips (not shown) is used at the same location. Though not preferred, Applicant's CMOS chips, like microprocessor 104, can also support a simple ON/OFF or certain "number-of-hours-on" approach—all are available in the same physical unit.

Alternatively, a field-programmable gate array ("FPGA") (not shown) can be used instead of CMOS chips. A FPGA is an integrated circuit designed to be configured by the customer or designer after manufacturing—hence field-programmable.

Each calendar day is 24 hours long. Time is relative, as each day equals a 24-hour cycle. Accordingly, the 24-hour cycles (utilized in Applicant's invention) capture when dusk and dawn occur (if at all) each day, even though the local timer (or counter) may not match Greenwich Time. Therefore, Applicant's processes 100, 300 for synchronizing the on and off times for a streetlight can be thought of broadly, in terms of days, as:

a. sensing, via a photocell, dusk and dawn adjacent the streetlight;
b. recording when each dusk and dawn occurs;
c. calculating (or noting) the average dusk-to-dawn interval of a plurality of immediately preceding days;
d. turning on the streetlight at the next dusk time;
e. turning off the streetlight after a desired percentage of the calculated average dusk-to-dawn interval; and
f. wherein the on and off times for the streetlight are determined by sensing and analyzing local conditions to update the on and off times without human intervention.

Applicant's method (see FIG. 1) for synchronizing the on and off times for a streetlight can also be thought of as comprising:

a. sensing, via a photocell, when dusk and dawn occurs adjacent the streetlight;
b. recording digitally when dusk and dawn occurs during successive 24-hour cycles;
c. calculating (or noting) the average dusk-to-dawn interval of a plurality of immediately preceding 24-hour cycles;
d. predicting the next dusk time;
e. turning on the streetlight at the next dusk time;
f. turning off the streetlight after a preselected (or desired) percentage of the average dusk-to-dawn interval; and
g. wherein the on and off times for the streetlight are determined by sensing and analyzing local conditions to update the on and off times without human intervention.

It should be understood by those skilled in the art that obvious structural and process modifications can be made to the Autonomous Streetlight Control without departing from the spirit of the invention. For example, one set of control components can operate several streetlights. Accordingly, reference should be made primarily to the accompanying claims rather than the foregoing description to determine the scope of the invention.

I claim:

1. A method for synchronizing the on and off times for a streetlight, the method comprising:
   a. sensing, via a photocell, when dusk and dawn occurs adjacent the streetlight;
   b. recording digitally when dusk and dawn occurs during successive 24-hour cycles;
   c. calculating the average dusk-to-dawn interval of a plurality of immediately preceding 24-hour cycles;
   d. predicting when the next dusk will occur during a 24-hour cycle;
   e. turning on the streetlight at the predicted next dusk;
   f. turning off the streetlight after a preselected percentage of the average dusk-to-dawn interval; and
   g. wherein the on and off times for the streetlight are determined by sensing and analyzing local conditions to update the on and off times without human intervention.

2. The method of claim 1 wherein the amount of time the streetlight is on varies during each season.

3. The method of claim 1 wherein a microprocessor conducts steps b-f.

4. The method of claim 2 wherein CMOS chips conducts steps b-f.

5. The method of claim 1 further comprising:
   a. providing a multi-voltage relay power supply for lighting the streetlight subject to the microprocessor,
      i. wherein the relay power supply can operate by receiving an inlet-to-logic power supply within 120 V-480 V by virtue of using diodes, a FET, a relay and resistor in series.

6. A method for synchronizing the on and off times for a streetlight due to local conditions, said method comprising:
   a. sensing, via a photocell, dusk and dawn adjacent the streetlight;
   b. recording, via a microcontroller, when each dusk and dawn occurs;
   c. calculating, via the microcontroller, the average dusk-to-dawn interval of a plurality of immediately preceding days;
   d. predicting, via the microcontroller, the next dusk time;
   e. turning on the streetlight, via the microcontroller, at the predicted next dusk time;
   f. turning off the streetlight after a desired percentage of the calculated average dusk-to-dawn interval; and
   g. wherein the turning on and turning off times for the streetlight are determined by sensing and analyzing local conditions to update the times without human intervention.

7. The method of claim 6 wherein the desired percentage is preselected.

8. The method of claim 6 further comprising turning on the streetlight even if the photocell becomes shaded or inoperable, based on short-term projection of prior days and predicting the next dusk time.

9. The method of claim 6 wherein the amount of time the streetlight is on varies during each season.

10. A method for synchronizing the on and off times for a streetlight due to local conditions, said method comprising:
 a. sensing, via a photocell, dusk and dawn adjacent the streetlight;
 b. noting when each dusk and dawn occurs;
 c. calculating the average dusk-to-dawn interval of a plurality of immediately preceding days;
 d. turning on the streetlight, via the microcontroller, at the next dusk;
 e. turning off the streetlight after a desired percentage of the calculated average dusk-to-dawn interval; and
 f. wherein the turning on and turning off times for the streetlight are determined by sensing and analyzing local conditions to update the times without human intervention.

11. The method of claim 10 wherein the desired percentage is preselected.

12. The method of claim 10 further comprising turning on the streetlight even if the photocell becomes shaded or inoperable, based on short-term projection of prior days and predicting the next dusk time.

13. The method of claim 10 wherein the amount of time the streetlight is on varies during each season.

\* \* \* \* \*